(12) United States Patent
Eburne

(10) Patent No.: US 10,376,050 B2
(45) Date of Patent: Aug. 13, 2019

(54) MULTI-FUNCTIONAL KITCHEN DEVICE

(71) Applicant: PURPOSE BUILT, INC., Los Angeles, CA (US)

(72) Inventor: Alexander Eburne, Los Angeles, CA (US)

(73) Assignee: PURPOSE BUILT, INC., Los Angeles, CA (US)

( * ) Notice: Subject to any disclaimer, the term of this patent is extended or adjusted under 35 U.S.C. 154(b) by 0 days.

(21) Appl. No.: 15/853,629

(22) Filed: Dec. 22, 2017

(65) Prior Publication Data

US 2019/0191875 A1    Jun. 27, 2019

(51) Int. Cl.
| | | |
|---|---|---|
| A47B 77/16 | (2006.01) | |
| A47B 77/02 | (2006.01) | |
| A47J 47/16 | (2006.01) | |
| A47J 43/07 | (2006.01) | |
| A47J 43/28 | (2006.01) | |

(52) U.S. Cl.
CPC ............. *A47B 77/16* (2013.01); *A47B 77/02* (2013.01); *A47J 43/0727* (2013.01); *A47J 47/16* (2013.01); *A47J 43/28* (2013.01)

(58) Field of Classification Search
CPC .......... A47J 47/005; A47J 47/16; A47J 47/02; A47J 47/04; A47J 47/06; A47J 47/08; A47J 47/10
USPC ...... 269/289 R; 47/41.01, 41.11; 211/74, 76, 211/85.18; 312/117, 119, 122, 129, 130, 312/138.1, 290
See application file for complete search history.

(56) References Cited

U.S. PATENT DOCUMENTS

| | | | | | |
|---|---|---|---|---|---|
| 1,892,349 | A | * | 12/1932 | Johnsen | A47J 47/16 |
| | | | | | 211/85.17 |
| 2,197,034 | A | * | 4/1940 | Douglass | A45C 11/20 |
| | | | | | 126/266 |

(Continued)

FOREIGN PATENT DOCUMENTS

| | | | |
|---|---|---|---|
| CA | 2510224 | * | 12/2006 |
| DE | 9311899 | * | 1/1995 |

(Continued)

OTHER PUBLICATIONS

CN 201492331; Zhang; abstract and figure (Year: 2010).*

(Continued)

*Primary Examiner* — Janet M Wilkens
(74) *Attorney, Agent, or Firm* — Kanika Radhakrishnan; Evergreen Valley Law Group

(57) ABSTRACT

Disclosed is a multi-functional kitchen device. The device comprises a hollow body having a plurality of compartments; a plurality of first containers configured to be slidably received by a plurality of first compartments; a plurality of second containers configured to be slidably received by a plurality of second compartments; a first drawer configured to be slidably received by a third compartment; a second drawer configured to be slidably received by a fourth compartment; a plurality of kitchen accessories configured to be stored in the second drawer, each of the plurality of kitchen accessories is operable to fit onto one of the plurality of first containers; and a cover foldably coupled to the hollow body, the cover is configured to unfold to define a chopping board and fold to cover the plurality of first and second compartments.

17 Claims, 5 Drawing Sheets

(56) References Cited

U.S. PATENT DOCUMENTS

| | | | | | |
|---|---|---|---|---|---|
| 3,338,629 | A | * | 8/1967 | Drees | B60N 3/002 224/275 |
| 3,442,371 | A | * | 5/1969 | Deshong | B65D 11/00 206/45.23 |
| 4,057,309 | A | * | 11/1977 | Fragale | A47B 43/02 312/259 |
| 4,799,744 | A | * | 1/1989 | Toy | A47J 47/16 211/184 |
| 5,095,649 | A | * | 3/1992 | Brownlee | A47G 7/041 47/41.01 |
| 5,102,209 | A | * | 4/1992 | Hesseltine | A47B 81/00 312/244 |
| 5,382,009 | A | * | 1/1995 | Mertz | A45C 15/00 269/16 |
| 6,006,502 | A | * | 12/1999 | Smith | B25H 1/04 206/225 |
| D440,472 | S | * | 4/2001 | Paschal | D7/698 |
| 6,619,768 | B1 | * | 9/2003 | Northrop | A45F 3/46 312/290 |
| 6,651,970 | B2 | | 11/2003 | Scott | |
| 7,150,221 | B2 | * | 12/2006 | Morgan | A21B 3/13 99/428 |
| 7,258,289 | B1 | * | 8/2007 | Butt | A47J 47/005 241/100 |
| 9,013,071 | B1 | * | 4/2015 | Levi | A45D 44/02 191/12 R |
| 2002/0148831 | A1 | * | 10/2002 | Dicello | A47J 47/16 220/23.2 |
| 2003/0234205 | A1 | | 12/2003 | McGuyer | |
| 2007/0108686 | A1 | * | 5/2007 | Casale | A47J 47/005 269/289 R |
| 2008/0277856 | A1 | * | 11/2008 | Tortora | A47J 47/005 269/289 R |
| 2008/0296823 | A1 | * | 12/2008 | Pourounidis | A47J 47/005 269/289 R |
| 2009/0218742 | A1 | * | 9/2009 | Shew | A47J 47/005 269/16 |
| 2012/0073998 | A1 | * | 3/2012 | He | B42F 9/002 206/216 |
| 2012/0111815 | A1 | * | 5/2012 | Berry | A47J 47/16 211/74 |
| 2012/0292327 | A1 | * | 11/2012 | Carey | A45C 11/20 220/592.2 |
| 2013/0020330 | A1 | * | 1/2013 | Luft | A47J 47/02 220/523 |
| 2013/0313350 | A1 | * | 11/2013 | Baranoff | A47J 47/005 241/101.2 |
| 2014/0097566 | A1 | * | 4/2014 | Rivera | A47J 47/005 269/16 |
| 2017/0020341 | A1 | | 1/2017 | Farmer | |
| 2017/0081080 | A1 | * | 3/2017 | Alves | A47J 47/06 |

FOREIGN PATENT DOCUMENTS

| | | | |
|---|---|---|---|
| DE | 10060723 A | | 6/2002 |
| DE | 102006059484 | | 6/2008 |
| DE | 202012101042 | * | 6/2012 |
| FR | 2601577 | * | 1/1988 |
| FR | 2676424 | * | 11/1992 |
| WO | 2006051376 | * | 5/2006 |

OTHER PUBLICATIONS

CN 202172618; He X et al; abstract and figure (Year: 2012).*
KR 2017061503; Yo S M; abstract and figure (Year: 2017).*
KR 2016004203; Jin R K; abstract and figure (Year: 2016).*

* cited by examiner

MULTI-FUNCTIONAL KITCHEN DEVICE

TECHNICAL FIELD

The present disclosure relates generally to a kitchen appliance, more particularly to, a multi-functional kitchen device.

BACKGROUND

Cooking nowadays involve use of multiple kitchen accessories or implements. Typically, such kitchen accessories may include a grater, a zester, a slicer, a peeler and so forth. The intent of using such multiple kitchen accessories is primarily based on lowering the overall cooking time and the effort. Also, the use of multiple kitchen accessories may help in cooking multiple dishes simultaneously.

However, managing such kitchen accessories individually is associated with numerous problems. For example, storing such kitchen accessories before and after use thereof is one such problem. In order to address such storing problem, devices are known that enable in storing kitchen accessories before and after use thereof. However, such devices are associated with the problems of managing cooking space and managing cooking material waste disposal. Also, such devices merely enable in processing raw cooking material, and do not help in managing processed raw cooking material. For example, such devices do not help in storing processed raw cooking material, measuring processed raw cooking material for cooking and so forth.

In light of the foregoing discussion, there exists a need to overcome the aforementioned drawbacks of managing kitchen accessories.

SUMMARY

Various embodiments of the present disclosure provide a multi-functional kitchen device.

In an embodiment, a multi-functional kitchen device is disclosed. The device comprises a hollow body having a plurality of compartments, the plurality of compartments are configured to receive a plurality of containers and drawers therein. The device further comprises a plurality of first containers configured to be slidably received by a plurality of first compartments of the plurality of compartments. The device also comprises a plurality of second containers configured to be slidably received by a plurality of second compartments of the plurality of compartments. The device further comprises a first drawer configured to be slidably received by a third compartment of the plurality of compartments; the third compartment is configured underneath the plurality of first compartments. The device also comprises a second drawer configured to be slidably received by a fourth compartment of the plurality of compartments; the fourth compartment is configured underneath the plurality of second compartments. The device further comprises a plurality of kitchen accessories configured to be stored in the second drawer; each of the plurality of kitchen accessories is operable to fit onto one of the plurality of first containers. The device also comprises a cover foldably coupled to the hollow body, the cover is configured to unfold to define a chopping board and fold to cover the plurality of first and second compartments.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
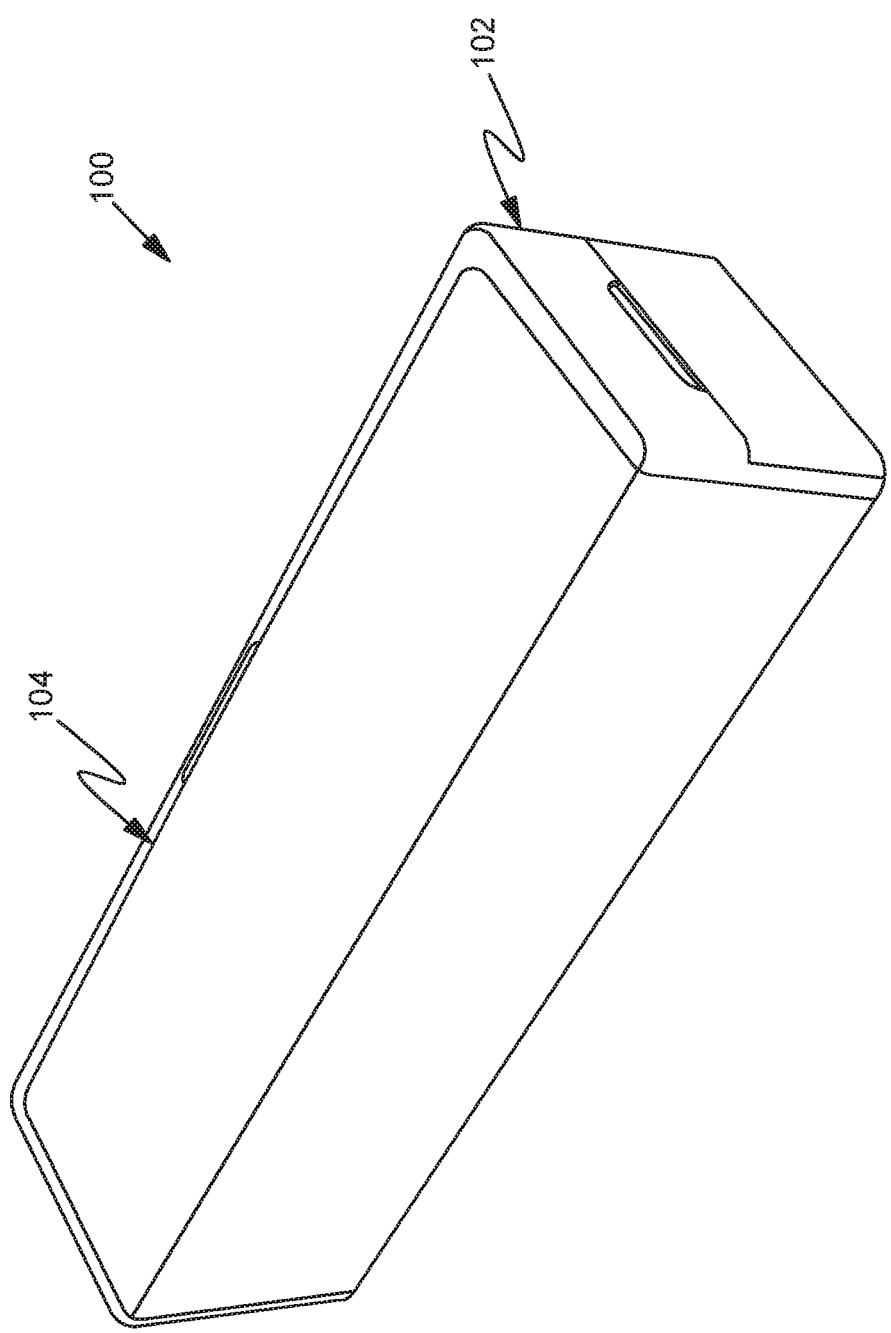
FIG. 1 is a perspective view of a multi-functional kitchen device, in accordance with an example embodiment.

Referring now to the drawings, FIG. 1 is a perspective view of a multi-functional kitchen device 100, in accordance with an example embodiment. As shown, the device 100 includes a hollow body 102 and a cover 104 foldably coupled to the hollow body 102. The cover 104 is shown in a folded position.

According to an embodiment, the cover 104 includes at least one magnet operable to retain the cover 104 in the folded position. In an example, the cover 104 may include a plurality of magnets (not shown) mounted (or arranged) on a periphery of the cover 104, and corresponding magnets having opposite poles may be mounted on a periphery of the hollow body 102 for establishing magnetic coupling between the cover 104 and the hollow body 102. As shown, the device 100 attain (or includes) a cuboidal shape. In an embodiment, the device 100 attaining the cuboidal shape (as show in FIG. 1) includes a length of 18 inches, a width of 6 inches and a height of 6 inches.

Figure 2:
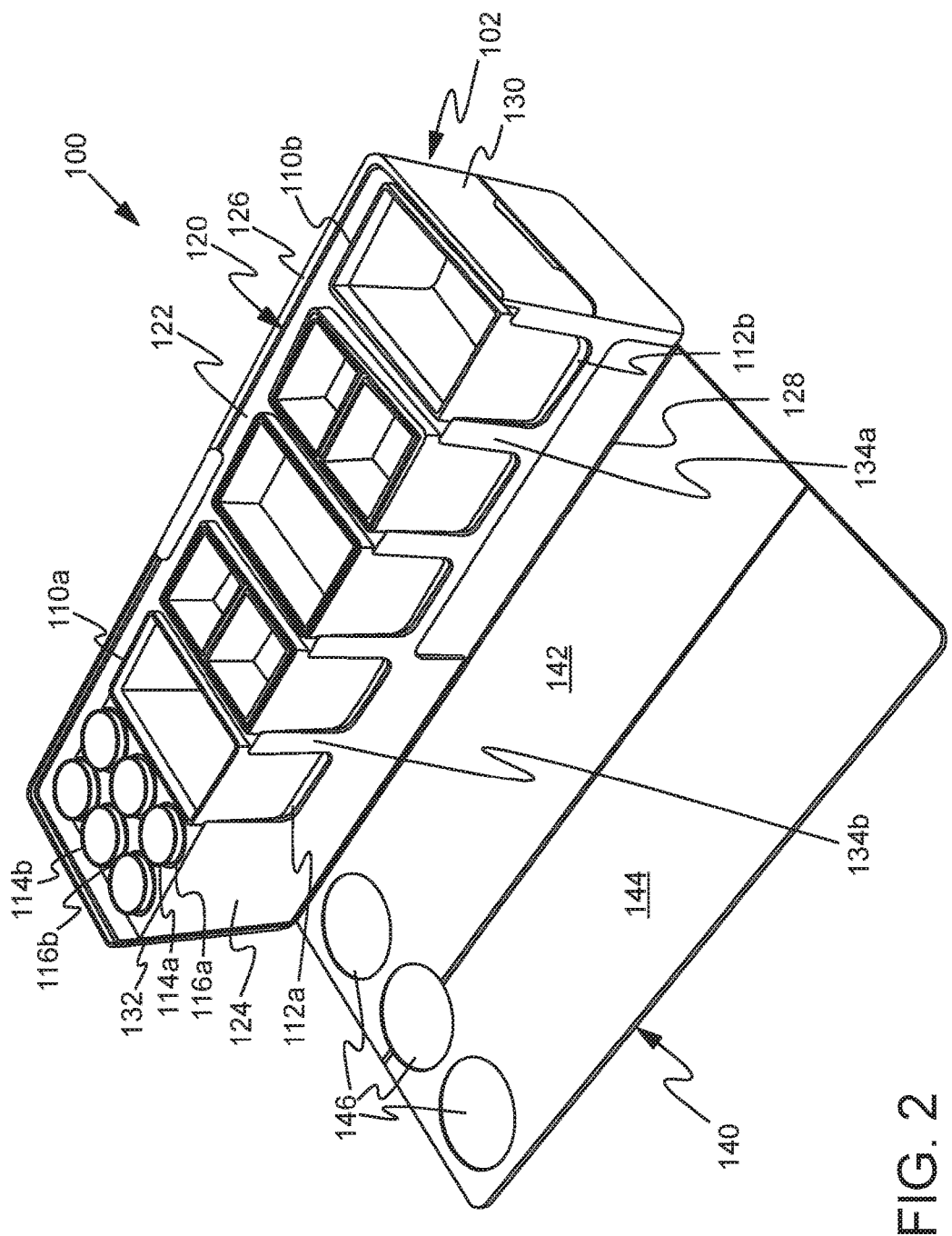
FIG. 2 is a perspective view of the device of FIG. 1 with a cover of the device in an unfolded position, in accordance with an example embodiment.

Referring now to FIG. 2, illustrated is a perspective view of the device 100 of FIG. 1 with the cover 104 of the device 100 in an unfolded position, in accordance with an example embodiment. As shown, the hollow body 102 includes a plurality of compartments, and the plurality of compartments is configured to receive a plurality of containers and drawers therein. For example, the device 100 includes a plurality of first containers, such as first containers 110a and 110b configured to be slidably received by a plurality of first compartments, such as first compartments 112a, 112b, respectively, of the plurality of compartments. The device 100 also includes a plurality of second containers, such as second containers 114a and 114b, configured to be slidably received by a plurality of second compartments, such as second compartments 116a and 116b, respectively, of the plurality of compartments. The plurality of the first and second containers 110a, 110b, and 114a, 114b will be explained in greater detail in conjunction with FIG. 5 herein later.

As shown in FIG. 2, the hollow body 104 comprises a deck 120 having a horizontal wall 122 and a vertical wall 124. The vertical wall 124 is coupled to and oriented perpendicular to the horizontal wall 122. The hollow body 104 also includes a side wall 126 and a bottom wall 128. The bottom wall 128 is coupled to and oriented perpendicular to the side wall 126. Further, the side wall 126 is coupled to the horizontal wall 122 and the bottom wall 128 is coupled to the vertical wall 124. Moreover, the side wall 126 is oriented perpendicular to the horizontal wall 122, and the bottom wall 128 is oriented perpendicular to the vertical wall 124.

The hollow body 104 further includes a first lateral wall section 130 and a second lateral wall section 132 configured between the vertical wall 124 and the side wall 126. Further, the first lateral wall section 130 and a second lateral wall section 132 are configured away from the bottom wall 128 and underneath the horizontal wall 122.

According to an embodiment, the horizontal and the vertical walls 122, 124 include a plurality of ridges, such as ridges 134a, 134b, defining the plurality of first compartments, such as the compartments 112a, 122b. It will be appreciated that a pair of ridges define a compartment. Also, a compartment, such as the compartment 112b, may be configured between the first lateral wall section 130 and the ridge 134a. Similarly, a compartment, such as the compartment 112a, may be configured between the second lateral wall section 132 and the ridge 134b. Although, the compartment 112a is configured between the ridge 134b and a portion of the horizontal wall 122 having the second compartments 116a, 116b. As shown, the hollow body 104 includes five first compartments, such as the first compartments 112a, 122b and three central first compartments (configured between the first compartments 112a, 122b). Further, the three central first compartments are defined by pair of ridges. It will be appreciated that the hollow body 104 may include more or less than five first compartments, such as three first compartments or ten first compartments.

The horizontal wall 122 further includes a plurality of holes defining the plurality of second compartments 116a, 116b. Specifically, the portion of the horizontal wall 122, between the second lateral wall section 132 and the ridge 134b, is configured with the plurality of holes defining the plurality of second compartments 116a, 116b. It will be appreciated that plurality of second compartments 116a, 116b is configured by through-holes on the portion of the horizontal wall 122 between the second lateral wall section 132 and the ridge 134b.

As shown in FIG. 2, the device 100 also includes a cover 140 foldably coupled to the hollow body 102. The cover 140 includes two foldable flaps 142, 144 coupled to each other. Further, the foldable flap 142 is coupled to the bottom wall 128. The cover 140 is configured to unfold (as shown in FIG. 2) to define a chopping board. Also, the cover 140 is configured to fold to cover the plurality of first compartments, such as the first compartments 112a, 112b, and the plurality of second compartments, such as the second compartments 116a, 116b. The cover 140 also includes a plurality of depression 146 configured thereon.

Figure 3:
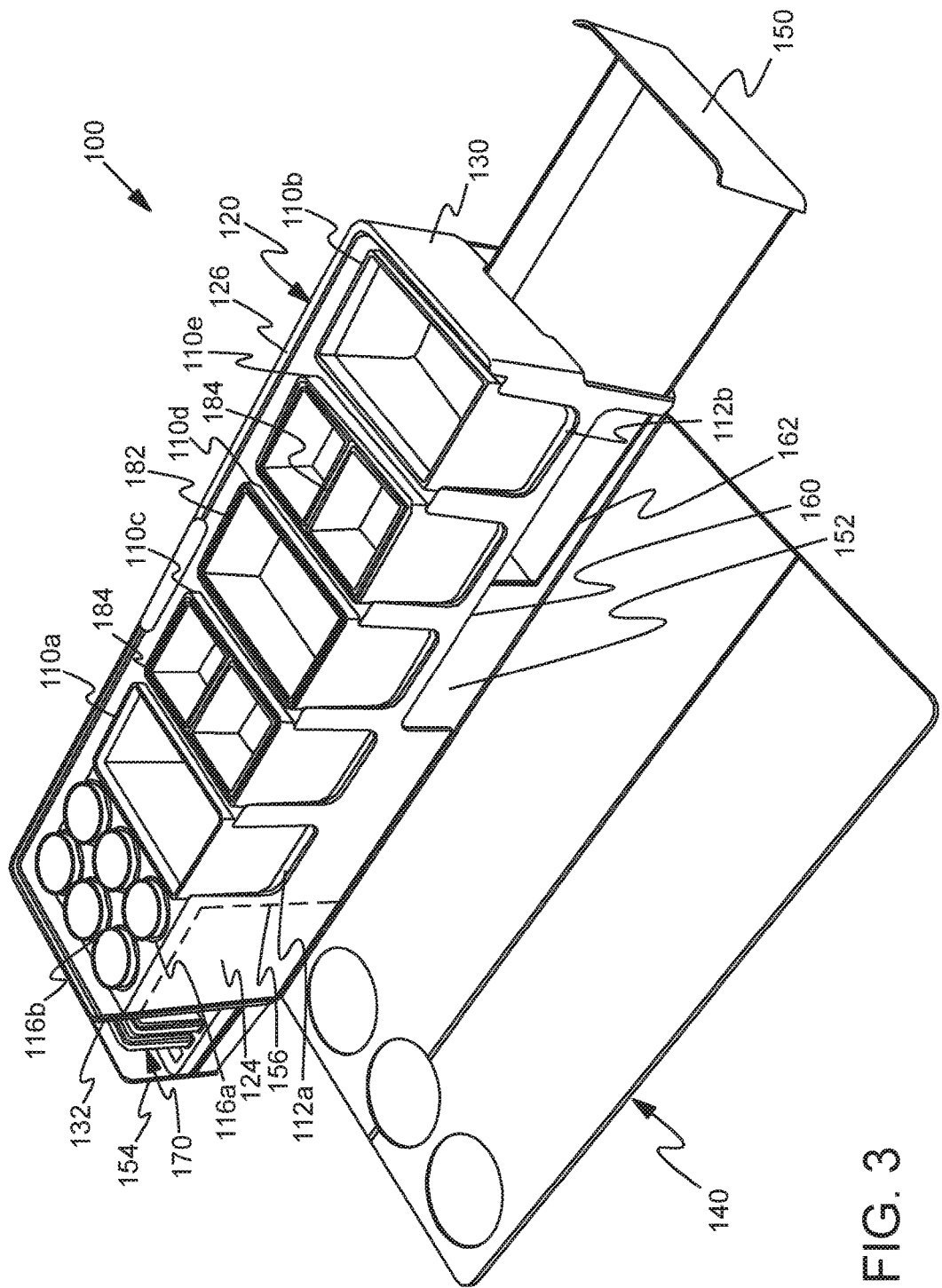
FIG. 3 is a perspective view of the device of FIG. 2 with drawers of the device in open positions, in accordance with an example embodiment.

Referring now to FIG. 3, illustrated is a perspective view of the device 100 of FIG. 2 with drawers of the device in open positions, in accordance with an example embodiment. The device 100 includes a first drawer 150 configured to be slidably received by a third compartment 152 of the plurality of compartments. The third compartment 152 is configured underneath the plurality of first compartments, such as the first compartments 112a, 112b. The device 100 also includes a second drawer 154 configured to be slidably received by a fourth compartment 156 (shown with dashed lines) of the plurality of compartments. The fourth compartment 156 is configured underneath the plurality of second compartments, such as the second compartments 116a, 116b. Further, the third compartment 152 and the fourth compartment 156 are configured underneath the first and second lateral wall sections 130, 132, respectively, and between the vertical wall 124 and side wall 126. It will be appreciated that the folded position of the cover 140 with the first and second drawers 150, 154 received in the third and fourth compartments 152, 156, respectively, allows the device 100 attain the cuboidal shape (as shown in FIG. 1).

As shown in FIG. 3, the vertical wall 124 includes a cutout section 160 to provide access to the first drawer 150. Specifically, the first drawer 150 includes an open section 162 aligning to the cutout section 160 to enable access of the first drawer 150. More specifically, the vertical wall 124 is configured to have the cutout section 160, which aligns to the open section 162 of the first drawer 150 for configuring a through-opening between the vertical wall 124 and the first drawer 150 for access of the first drawer 150 when cover 140 is unfolded.

The device 100, as shown in FIG. 3, also include a plurality of kitchen accessories 170 configured to be stored in the second drawer 154. The plurality of kitchen accessories 170 will be explained in greater detail in conjunction with FIG. 4 herein later.

Figure 4:
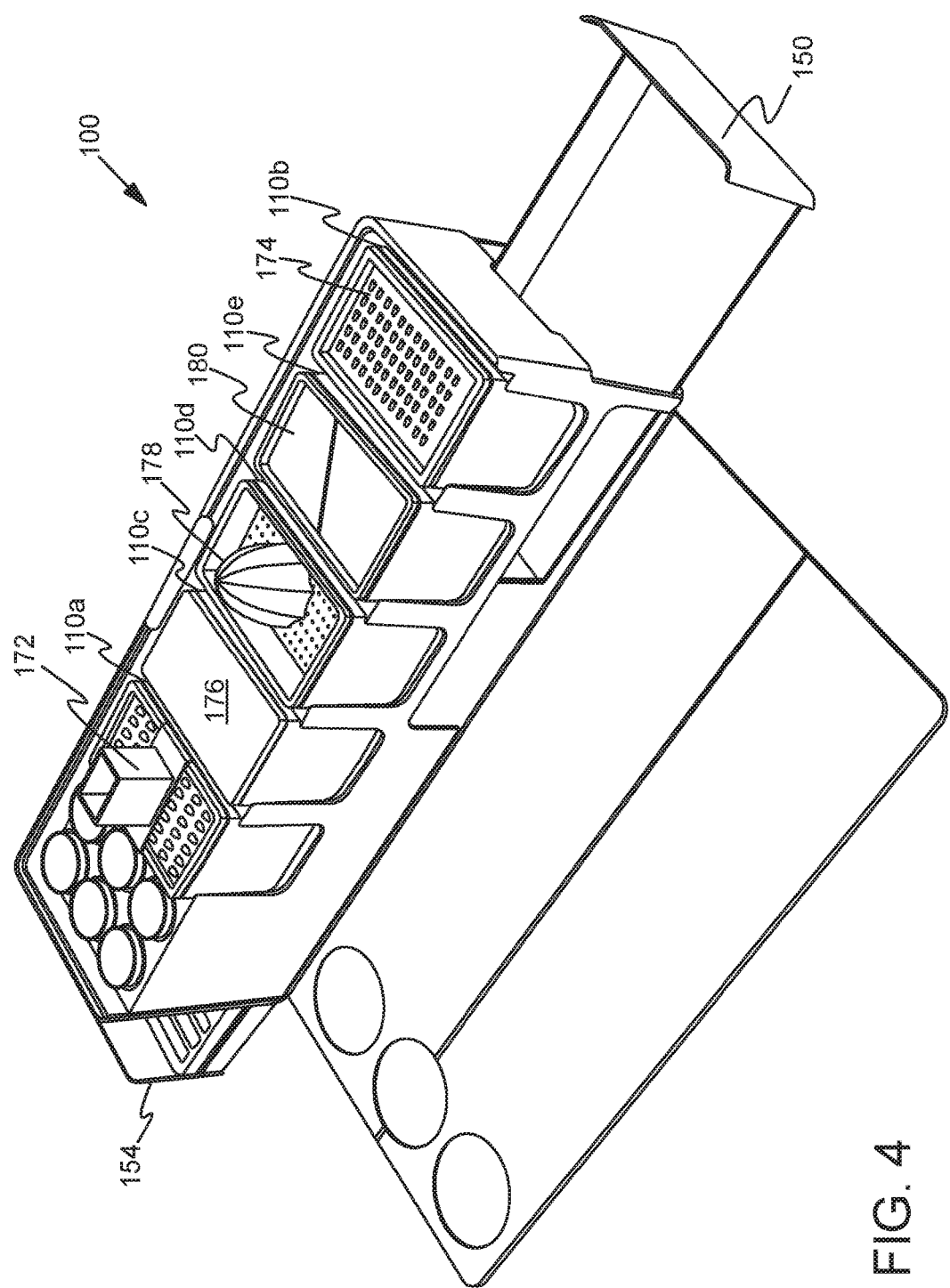
FIG. 4 is a perspective view of the device of FIG. 3 with kitchen accessories mounted on a plurality of first containers of the device, in accordance with an example embodiment.

Referring now to FIG. 4, illustrated is a perspective view of the device 100 of FIG. 3 with kitchen accessories 170 (shown in FIG. 3) mounted on a plurality of first containers 110a-110e of the device 100, in accordance with an example embodiment. According to an embodiment, the plurality of kitchen accessories 170 (shown in FIG. 3) includes a grater, a juicer reamer, a zester, a slicer, a garlic crusher. Further, each of the plurality of kitchen accessories 170 is operable to fit onto one of the plurality of first containers 110a-110e. The plurality of kitchen accessories further includes at least one lid operable to fit onto the plurality of first containers 110a-110e. For example, as shown in FIG. 4, the first container 110a is mounted with a garlic crusher 172. The garlic crusher 172 is a two part accessory operable to be mounted on one of a zester, grater or slicer. As shown, the garlic crusher 172 is mounted on a grater fit onto the first container 110a. Further, the first container 110b is mounted with a grater 174. Furthermore, the first container 110c is mounted with a lid 176. Moreover, the first container 110d is mounted with a juicer reamer 178. Additionally, the first container 110e is mounted with a slicer 180. It will be appreciated that the plurality of kitchen accessories, such as the kitchen accessories 172-180, may be also stored in the first drawer 150 in addition to the second drawer 152, in an unused (or after use) condition of the device 100.

Referring back to FIG. 3, the device 100 further includes at least one third container, such as a third container 182, and at least one fourth container, such as fourth containers 184. The at least one third, such as the third container 182, and at least one fourth container, such the fourth containers 184, are configured to be received by the plurality of first containers. For example, as shown in FIG. 3, the first container 110d is shown to receive the third container 182, and each of the first containers 110c, 110e are shown to receive a pair of third containers, such as the third containers 182. Further, the first containers 110a, 110b are shown alone (without any third or fourth containers).

It is to be understood that the plurality of kitchen accessories, such as the kitchen accessories 172-180 (shown in FIG. 4), is configured to fit onto the first containers 110a-110e with or without the third container, such as the third container 182, and the fourth container, such as the fourth container 184, received in the first containers 110a-110e. The first, second, third and fourth containers of the device 100 are further explained in greater detail in conjunction with FIG. 5.

Figure 5:
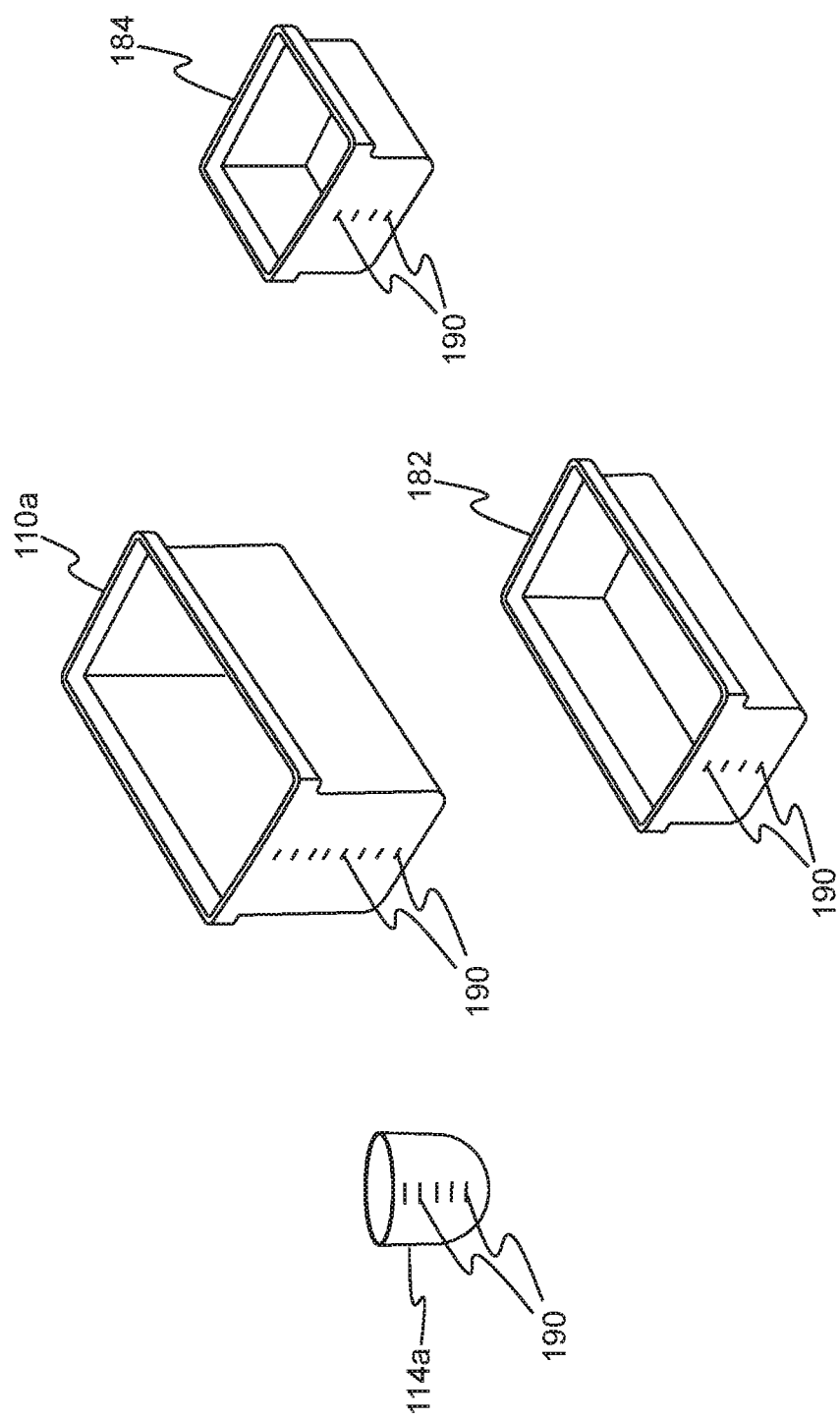
FIG. 5 is perspective views of a first container, a second container, a third container and a fourth container of the device of FIG. 1, in accordance with an example embodiment.

Referring now to FIG. 5, illustrated are perspective views of a first container, such as the first container 110a, a second container, such as the second container 114a, a third container, such as the third container 182, and a fourth container, such as the fourth container 184, of the device 100 of FIG. 1, in accordance with an example embodiment. As shown, each of the plurality of first containers, such as the first container 110a; the plurality of second containers, such as the second container 114a; the at least one third container, such as the third container 182; and the at least one fourth container, such as the fourth container 184, includes measuring lines 190.

Further, each of the plurality of first containers, such as the first container 110a; the at least one third container, such as the third container 182; and the at least one fourth container, such as the fourth container 184, is configured to be a rectangular shaped bowl. However, each of the plurality of second containers, such as the second container 114a, is configured to be a dome shaped bowl (or dome shaped glass). Furthermore, the plurality of first containers, such as the first container 110a, is larger in size as compared to the at least one third container, such as the third container 182. Moreover, the at least one third container, such as the third container 182, is larger in size as compared to the at least one fourth container, such as the fourth container 184. Additionally, the at least one fourth container, such as the fourth container 184, is larger in size as compared to the plurality of second containers, such as the second container 114a.

According to an embodiment, each of the plurality of first containers, such as the first container 110a, is configured to have a volumetric capacity of about 610 millilitre (ml). Further, each of the plurality of second containers, such as the second container 114a, is configured to have a volumetric capacity of about 39.1 ml. Furthermore, the at least one third container, such as the third container 182, is configured to have a volumetric capacity of about 180.8 ml. Moreover, the at least one fourth container, such as the fourth container 184, is configured to have a volumetric capacity of about 87.6 ml. It should be noted that the abovementioned volumetric capacities for the containers 110a, 114a, 183 and 184 are examples only, and these should not be considered limiting to scope of the present disclosure, and these containers can be configured with varying sizes i.e. greater or fewer than the stated individual volumetric capacity of the containers.

Embodiments of the present disclosure substantially eliminate or at least partially address the aforementioned problems in the background, and provide an improved a multi-functional kitchen device. For example, the multi-functional kitchen device of the present disclosure enables in conveniently storing kitchen accessories before and after use thereof. Further, the kitchen accessories enable in processing raw cooking material, and the plurality of containers (such as first, second, third and fourth containers) also help in managing processed raw cooking material. For example, the plurality of containers (with lids on) enable in storing processed raw cooking material (grated, juiced, sliced and so forth). Further, the plurality of containers enables in measuring processed or unprocessed raw cooking material (for example, processed food extract, spices, oils, herbs and so forth) for cooking any dish that require measurement of raw cooking material. Also, the plurality of containers may be used for serving the processed raw cooking material. Furthermore, the plurality of containers (with or without a shallow container sitting inside a large container) is designed to be mounted with the kitchen accessories. The cover of the device enables in efficiently managing an over cooking space of a kitchen with its folded nature. Further, the depressions configured on the cover enable in separating or segregating chopped raw cooking material (like vegetables) during cooking. Furthermore, the first drawer enables in managing residue or trash generated from raw cooking material. Specifically, the first drawer is configured to act as a trash bin such that while cutting raw cooking material trash or residue thereof can be easily pushed into the first drawer. Thereafter, the first drawer can be simply removed from the device for throwing away the trash.

The embodiments illustrated and described herein as well as embodiments not specifically described herein but within the scope of aspects of the invention constitute exemplary multi-functional kitchen device.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:
1. A multi-functional kitchen device, the device comprising:
    a hollow body having a plurality of compartments, wherein the plurality of compartments are configured to receive a plurality of containers and drawers therein;

a plurality of first containers configured to be slidably received by a plurality of first compartments of the plurality of compartments;

a plurality of second containers configured to be slidably received by a plurality of second compartments of the plurality of compartments;

a first drawer configured to be slidably received by a third compartment of the plurality of compartments, wherein the third compartment is configured underneath the plurality of first compartments;

a second drawer configured to be slidably received by a fourth compartment of the plurality of compartments, wherein the fourth compartment is configured underneath the plurality of second compartments;

a plurality of kitchen accessories configured to be stored in the second drawer, wherein one or more kitchen accessory of the plurality of kitchen accessories are operable to fit onto one of the plurality of first containers; and a cover coupled to the hollow body, wherein the cover is configured to define a chopping board in an unfolded position, and
to cover the plurality of first and second compartments in a folded position,
wherein the hollow body comprises a deck having a horizontal wall and a vertical wall coupled to the horizontal wall, and
wherein the vertical wall includes a cutout section to provide access to the first drawer.

2. The device as claimed in claim 1, wherein the hollow body further comprises a side wall and a bottom wall coupled to the side wall, and wherein the side wall is coupled to the horizontal wall and the bottom wall is coupled to the vertical wall.

3. The device as claimed in claim 2, wherein the hollow body further comprises a first lateral wall section and a second lateral wall section configured between the vertical wall and the side wall, away from the bottom wall and underneath the horizontal wall.

4. The device as claimed in claim 3, wherein the third compartment and the fourth compartment are configured underneath the first and second lateral wall sections, respectively, and between the vertical and side walls.

5. The device as claimed in claim 1, wherein the horizontal and the vertical walls include a plurality of ridges defining the plurality of first compartments.

6. The device as claimed in claim 1, wherein the horizontal wall further includes a plurality of holes defining the plurality of second compartments.

7. The device as claimed in claim 1, further comprising at least one third container, and
at least one fourth container,
wherein the at least one third and fourth containers are configured to be received by the plurality of first containers.

8. The device as claimed in claim 7, wherein each of the plurality of first containers, the plurality of second containers, the at least one third container and the at least one fourth container includes measuring lines.

9. The device as claimed in claim 7, wherein
the plurality of first containers is larger in size as compared to the at least one third container,
the at least one third container is larger in size as compared to the at least one fourth container, and
the at least one fourth container is larger in size as compared to the plurality of second containers.

10. The device as claimed in claim 9, wherein
each of the plurality of first containers is configured to have a volumetric capacity of about 610 milliliter (ml),
each of the plurality of second containers is configured to have a volumetric capacity of about 39.1 ml,
the at least one third container is configured to have a volumetric capacity of about 180.8 ml, and
the at least one fourth container is configured to have a volumetric capacity of about 87.6 ml.

11. The device as claimed in claim 7, wherein
each of the plurality of first containers, the at least one third container and the at least one fourth container is configured to be a rectangular shaped bowl, and
each of the plurality of second containers is configured to be a dome shaped bowl.

12. The device as claimed in claim 1, wherein the first drawer includes an open section aligning to the cutout section to enable access of the first drawer.

13. The device as claimed in claim 1, wherein the plurality of kitchen accessories includes a grater, a juicer reamer, a zester, a slicer, and a garlic crusher.

14. The device as claimed in claim 13, wherein the plurality of kitchen accessories further includes at least one lid operable to fit onto the plurality of first containers.

15. The device as claimed in claim 1, wherein the cover includes a plurality of depressions configured thereon.

16. The device as claimed in claim 1,
wherein the folded position of the cover corresponds to covering the plurality of first compartments and the plurality of second compartments using a first flap of the cover,
wherein the unfolded position of the cover corresponds to uncovering the plurality of first compartments and the plurality of second compartments;
wherein the unfolded position of the cover allows the cover to function as the chopping board; and
wherein the folded position of the cover with the first and second drawers received in the third and fourth compartments, respectively, allows the device attain a cuboidal shape.

17. The device as claimed in claim 16, wherein the cuboidal shape includes a length of 18 inches, a width of 6 inches and a height of 6 inches.

* * * * *